United States Patent Office 3,507,630
Patented Apr. 21, 1970

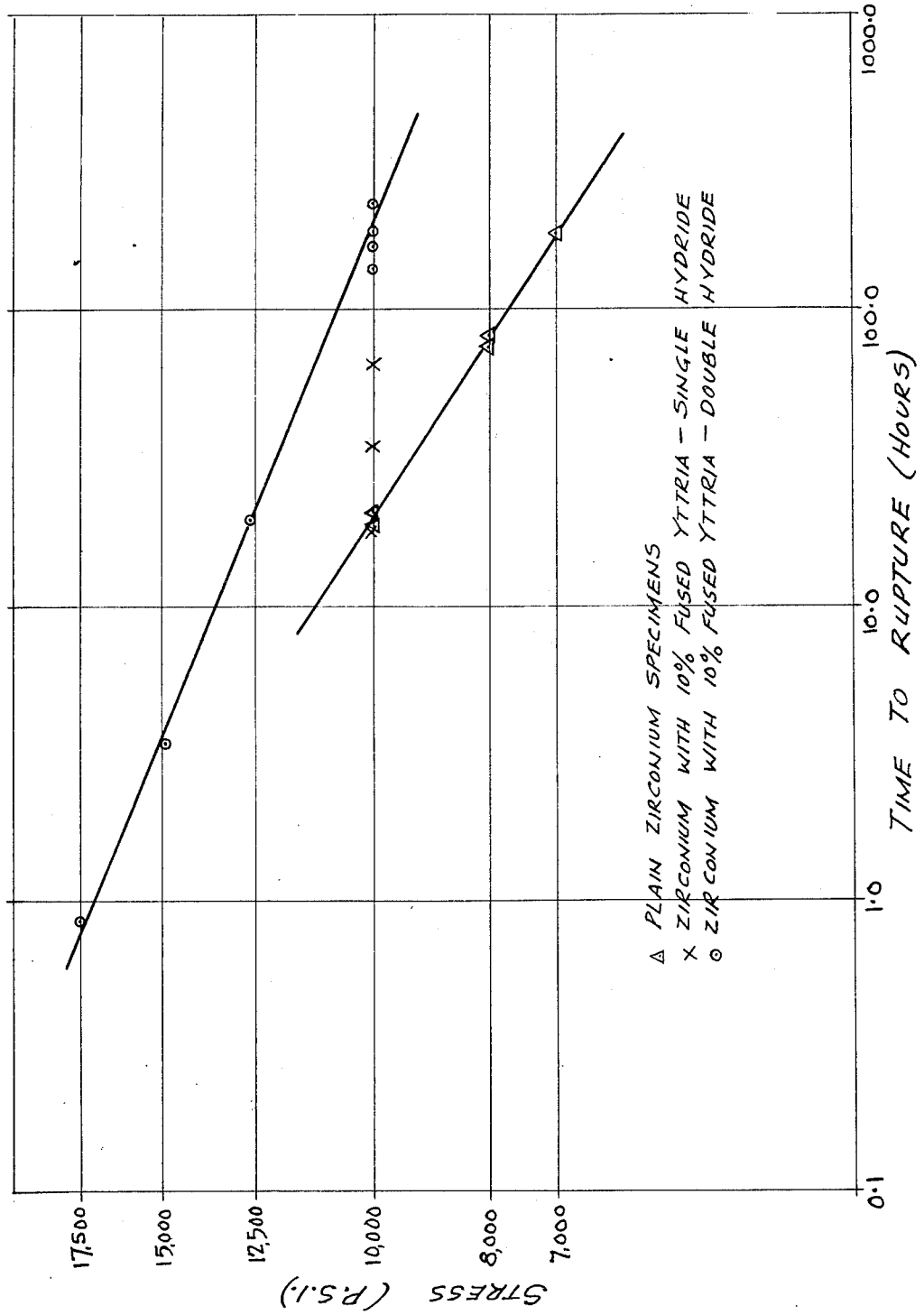

3,507,630
DISPERSION HARDENING OF ZIRCONIUM WITH FUSED YTTRIA
Joseph Rezek, 1587 King St. W., Hamilton, Ontario, Canada
Filed June 16, 1967, Ser. No. 646,613
Claims priority, application Canada, June 21, 1966, 963,495
Int. Cl. B22f 1/00; C22c 29/00, 31/04
U.S. Cl. 29—182.5               17 Claims

ABSTRACT OF THE DISCLOSURE

A process for preparing a zirconium-yttria dispersion by mixing powdered zirconium hydride and powdered, fused yttria. The mixture is subjected to pressure and sintered to decompose the hydride thereby producing a dispersion of yttria particles in a zirconium metal matrix.

---

This invention relates to powder metallurgy and in particular to the dispersion hardening of zirconium with yttria.

The object of the invention is to provide a process for preparing zirconium-yttria dispersions having greater high-temperature strength than zirconium metal.

Accordingly, the invention consists of a process for preparing a zirconium-yttria dispersion comprising the steps of mixing powdered zirconium hydride and powdered, fused yttria, applying pressure to the mixture thus produced, and sintering said mixture in an inert atmosphere, e.g., in vacuo to decompose the hydride thereby producing a dispersion of yttria particles in a substantially void-free zirconium metal matrix.

The use of fused yttria (yttria which has been fused, or melted and recrushed) produces stronger zirconium-yttria dispersions than those prepared with commercially available yttria produced by conventional chemical techniques, hereinafter referred to as ordinary yttria. The particle size of the fused yttria used in the process of the present invention is in the range of approximately 0.05 to 5 microns. These sizes are not critical and may be reduced further with advantage. The amount of yttria used is preferably between 1 and 20 volume percent of the dispersion.

According to one way of carrying out the process of the invention, powdered zirconium hydride and fused yttria having a particle size of less than 5 microns (approximately 0.05 to 5 microns) are mixed and milled for a period of up to 24 hours in a hardened steel rod-mill in an atmosphere of purified argon. The powder is cold pressed at 50 to 60 tons/in.$^2$ and sintered in a vacuum for from 6 to 8 hours at 1200° C. During sintering the hydride decomposes leaving yttria particles dispersed in a substantially void-free zirconium metal matrix. This product is referred to hereinafter as the single hydride product. The zirconium in the dispersion is converted back to zirconium hydride ("rehydrided") by heating the dispersion at 800° C. in the presence of hydrogen at one atmosphere pressure until equilibrium is reached. The dispersion is then furnace cooled in hydrogen to room temperature, remilled for a period of 24 hours, recompacted at from 50 to 60 tons/in.$^2$, and resintered in a vacuum for 8 hours at 1200° C. This product is referred to hereinafter as the double hydride product.

Table 1 shows the results of tests conducted with tensile test specimens containing 10 volume percent fused yttria and having a gauge length of 0.75 in. and a diameter of 0.14 in. which were subjected to a stress of 10,000 p.s.i. at 500° C. in a purified argon atmosphere.

The specimens were prepared from fused yttria having a particle size in the range of approximately 0.05 to 5 microns, the mixing, milling and sintering of the yttria and zirconium being carried out under conditions similar to those described above.

TABLE 1

| Specimen | Number | Minimum Creep Rate, in./in. h. | Rupture time (h.) |
|---|---|---|---|
| Zr | 1 | 5.1×10$^{-3}$ | 19.8 |
|    | 2 | 7.3×10$^{-3}$ | 17.9 |
| Single hydride product | 3 | 1.2×10$^{-3}$ | 65.7 |
|    | 4 | 2.6×10$^{-3}$ | 34.3 |
|    | 5 | -------- | 17.7 |
| Double hydride product | 6 | 2.7×10$^{-4}$ | 228.7 |
|    | 7 | 3.0×10$^{-4}$ | 185.4 |
|    | 8 | 5.6×10$^{-4}$ | 162.5 |
|    | 9 | 6.3×10$^{-4}$ | 138.6 |

A comparison of the results obtained from specimens 1 and 2, with those obtained for specimens 3 and 4 shows that the single hydride is on the average stronger than zirconium by itself. A comparison of the results obtained for specimens 3 and 4, with those obtained for specimens 6 and 7 shows that the rehydriding process improves the average rupture time under 10,000 p.s.i. stress at 500° C. from about 50 to about 200 hours and improves the creep rate from 2×10$^{-3}$ to 3×10$^{-4}$ in./in. h.

Additional 500° C. results for similar specimens but at different stress levels are shown in Table 2 and a graph of the logarithm of rupture time as a function of the logarithm of stress, comprising all the data, is shown in the accompanying drawing:

TABLE 2

| Specimen | No. | Stress (p.s.i.) | Minimum Creep Rate, in./in. h. | Rupture time (h.) |
|---|---|---|---|---|
| Zr | 10 | 7,000 | 1.1×10$^{-3}$ | 177.0 |
|    | 11 | 8,000 | 2.0×10$^{-3}$ | 75.0 |
|    | 12 | 8,000 | 3.6×10$^{-3}$ | 79.0 |
| Double hydride product | 13 | 12,500 | 3.8×10$^{-3}$ | 19.1 |
|    | 14 | 15,000 | 1.8×10$^{-2}$ | 3.4 |
|    | 15 | 17,500 | 7.1×10$^{-2}$ | 0.85 |

From this it is clear that the improvement in rupture time associated with the rehydriding process extends over a considerable range of stress and, further, that the stress level necessary to cause rupture at a given time is appreciably higher for the double hydrided product compared with that for pure zirconium or for the single hydrided product.

The improvement in the strength of the double hydride product is believed to be due to a more uniform dispersion of the yttria particles than in the single hydride product, and a reduction in the average grain size of the zirconium matrix coupled with the locking of the grain boundaries by yttria particles.

The use of powdered, fused yttria rather than ordinary yttria is also believed to account for the strength of the rehydrided dispersion. Rehydrided dispersion specimens prepared from ordinary yttria and tested under the same conditions as the specimens of Table 1 give rupture times in the order of 15 hours.

Tensile strength and creep tests at 500° C., carried out on rehydrided dispersions containing 10% by volume crushed, fused yttria and on sinters containing no dispersoid, as seen in Table 3, indicate a large increase in creep strength and short term tensile strength for sinters containing yttrium oxide. The tensile strength tests of Table 3 were conducted with a strain rate of 0.050 in./min.

TABLE 3

| Specimen | Tensile Data | | | Creep Data [1] |
|---|---|---|---|---|
| | 0.2% Yield Stress (p.s.i.) | Ultimate Tensile Strength (p.s.i.) | Percent Elongation (0.75 in g. l.) | Elongation in 17.7 hrs. (inch) |
| Zr | 20,350 | 24,400 | 19.3 | 0.060 |
| | 20,200 | 25,350 | 17.3 | 0.051 |
| 10% by vol. $Y_2O_3$–Zr | 30,350 | 34,200 | 11.4 | 0.004 |
| | 31,600 | 34,200 | 8.0 | 0.005 |

[1] Stress 10,500 p.s.i.

In accordance with an alternative embodiment of the invention, the powdered zirconium hydride and fused yttria can be sintered at a temperature of about 1000° C., to obtain a porous sinter, and then consolidated by hot-rolling in vacuo at from 925° C. to 1100° C. to about 50 to 60% reduction in area.

The advantage of the lower sintering temperature is that the degree of reaction between the zirconium and yttria is reduced making it possible to retain smaller yttria particles in the matrix. A further advantage, directly from the rolling treatment, may be a reduction in the grain size of the matrix and the introduction of strain in the form of stable dislocation arrays.

Furthermore, for some speciments sintered at 1200° C., a further hydriding and compaction cycle, i.e., triple hydriding to produce a triple hydride product, is advantageous.

It has also proved advantageous to sinter specimens for two or three successive 90-minute periods at 1000° C. with rehydriding, recrushing and hot-rolling between the sintering steps.

Table 4 shows the results of further tests conducted with double and triple hydride tensile test specimens containing 3 to 5 volume percent fused yttria which were subjected to stress tests similar to those of Table 2.

TABLE 4

| Specimen | Stress (p.s.i.) | Minimum Creep Rate (in./in. hr.) | Rupture time (hours) |
|---|---|---|---|
| 16. Double hydride product containing 3 volume percent fused yttria (sized <0.5 micron) sintered for 10 hours at 1,000° C., hot rolled in vacuo at 950° C. to 50% reduction in area, rehydrided, crushed and recompacted as above | 10,000 | 4.0×10⁻⁴ | 408.8 |
| 17. Same as specimen 16 | 12,000 | 9.4×10⁻⁴ | 112.6 |
| 18. Same as specimen 16 | 13,000 | 3.25×10⁻³ | 43.4 |
| 19. Same as specimen 16 | 14,000 | 5.5×10⁻³ | 22.3 |
| 20. (*) | 15,000 | 1.0×10⁻² | 10.3 |
| 21. Same as specimen 16, except product contains 5 volume percent fused yttria | 15,000 | 4.0×10⁻³ | 26.0 |
| 22. Triple hydride product containing 3 volume percent fused yttria (sized <0.5 micron) sintered for three successive 90 minute periods at 1,000° C. with intermediate rehydriding and recrushing | 15,000 | 4.15×10⁻³ | 16.7 |
| 23. Same as specimen 22 | 15,000 | 4.0×10⁻³ | 8.7 |
| 24. Triple hydride product containing 3 volume percent fused yttria (sized <0.5 micron) sintered for three successive 90 minute periods at 1,000° C. with intermediate rehydriding and recrushing, but with a final hot rolling in vacuo at 950° C. to 50% reduction in area | 15,000 | 3.0×10⁻⁴ | 306.1 |
| 25. Same as specimen 24 | 15,000 | 3.5×10⁻⁴ | 230.6 |

* The figures given for specimen 20 are obtained by extrapolation of a log stress-log rupture time or log stress-log creep rate plot.

A comparison of the results for specimen 16 to 21 with those obtained for specimens 23 and 24 shows that the triple hydride is on the average stronger than the double hydride. The hydrides of specimens 16 to 24 are prepared with very fine yttria powder which is separated from the bulk of the crushed fused yttria by means of a settling column. The liquid used in the column is methanol, and the vertical height of the column is about 3 feet. The yttria fraction sized less than 0.5 micron (according to the Stokes' settling relation) is selected and calcined, first in air and then in vacuum to remove organic contamination and water before use.

The multiple rehydriding and crushing steps result in a decrease in the average particle size and spacing in the finished products providing the sintering temperature or time is not sufficiently high to cause excessive reaction between the zirconium matrix and yttria particles. With this in mind, sintering at 1000° C. for 90 minutes is satisfactory.

I claim:

1. A process for preparing a zirconium-yttria dispersion comprising the steps of mixing powdered zirconium hydride and powdered, fused yttria, applying pressure to the mixture thus produced, and sintering said mixture in an inert atmosphere to decompose the hydride thereby producing a dispersion of yttria particles in a zirconium metal matrix.

2. A process according to claim 1 wherein said yttria constitutes 1 to 20% of the volume of said mixture.

3. The process of claim 1 including the steps of rehydriding said zirconium metal matrix, recrushing said dispersion, and resintering the latter thereby producing a uniform dispersion of yttria particles in a substantially void-free zirconium metal matrix.

4. The process of claim 3 including the further steps of rehydriding said matrix, recrushing said dispersion and resintering the latter thereby producing a more uniform dispersion of yttria particles.

5. The process of claim 1 wherein the particle size of said mixture is not more than 5 microns.

6. The process of claim 5 wherein the pressure applied to said mixture is from about 50 to 60 tons/in.²

7. The process of claim 1 wherein said mixture is sintered at about 1000° to about 1200° C.

8. The process of claim 1 wherein said mixture is sintered at about 1000° C., and hot-rolled in vacuo at from 925 to 1100° C.

9. The process of claim 3 wherein said matrix is rehydrided by heating the matrix in the presence of hydrogen.

10. The process of claim 3 wherein said matrix is heated at from 800 to 1000° C. during rehydriding.

11. The process of claim 1 wherein said zirconium hydride and yttria are crushed and mixed in an inert atmosphere.

12. A process for preparing a zirconium-yttria dispersion comprising the steps of mixing powdered zirconium hydride and from 3 to 5 volume percent powdered fused yttria, the particle size of said yttria being less than 0.5 micron, applying pressure to the mixture thus produced, sintering said mixture in an inert atmosphere for 90 minutes at 1000° C. to decompose the hydride thereby producing a dispersion of yttria particles in a zirconium metal matrix.

13. The process of claim 12 including the steps of rehydriding said zirconium metal matrix, recrushing said dispersion, and resintering the latter for 90 minutes at 1000° C. thereby producing a uniform dispersion of yttria particles in a substantially void-free zirconium metal matrix.

14. The process of claim 13 including the further steps of rehydriding said matrix, recrushing said dispersion and resintering the latter for 90 minutes at 1000° C. thereby producing a more uniform dispersion of yttria particles.

15. A zirconium-yttria dispersion comprising a zirconium metal matrix, and finely divided fused yttria dispersed in said matrix.

16. The dispersion of claim 15, wherein said yttria has a particle size of between 0.05 and 5 microns.

17. A dispersion according to claim 15, wherein yttria is present in said dispersion in an amount of from 1 to 20 volume percent of the dispersion.

(References on following page)

References Cited

UNITED STATES PATENTS

| | | | |
|---|---|---|---|
| 2,823,116 | 2/1958 | Angier | 75—214 XR |
| 2,849,313 | 8/1958 | Mansfield | 75—221 XR |
| 3,085,876 | 4/1963 | Alexander et al. | 29—182.5 XR |
| 3,279,916 | 10/1966 | Bufferd et al. | 75—206 |

FOREIGN PATENTS 735,472    8/1955    Great Britain.

CARL D. QUARFORTH, Primary Examiner

A. J. STEINER, Assistant Examiner

U.S. Cl. X.R.

75—206, 213, 221